(12) United States Patent
Hufnagel et al.

(10) Patent No.: US 8,681,290 B1
(45) Date of Patent: Mar. 25, 2014

(54) SYSTEM FOR IMPROVEMENT OF LIGHT INSERTION INTO A LIGHT GUIDE FROM LIGHT-EMITTING DIODES (LEDS)

(75) Inventors: Bruce D. Hufnagel, Marion, IA (US); Brian W. Walker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 824 days.

(21) Appl. No.: 12/456,884

(22) Filed: Jun. 24, 2009

(51) Int. Cl.
*G02F 1/1335* (2006.01)
*F21V 7/04* (2006.01)

(52) U.S. Cl.
USPC ............. 349/62; 349/64; 349/65; 362/606; 362/609; 362/612; 362/620; 362/621

(58) Field of Classification Search
USPC ........ 349/65, 62, 64; 362/606, 608, 612, 609, 362/619–622
See application file for complete search history.

(56) References Cited

U.S. PATENT DOCUMENTS

| | | | |
|---|---|---|---|
| 2007/0047261 A1* | 3/2007 | Thompson et al. | 362/623 |
| 2007/0058359 A1* | 3/2007 | Saitoh et al. | 362/97 |
| 2008/0231772 A1* | 9/2008 | Hung | 349/65 |
| 2010/0123839 A1* | 5/2010 | Lu | 349/15 |

\* cited by examiner

*Primary Examiner* — Nathanael R Briggs
(74) *Attorney, Agent, or Firm* — Donna P. Suchy; Daniel M. Barbieri (57) ABSTRACT

The present invention is a display assembly in which a backlight module generates light beams via a light source. The light source provides the light beams to a light guide of the backlight module. The light guide then provides the light beams to a display panel of the display assembly for illuminating the display panel. One or more optical elements are implemented between the light source and an insertion edge of the light guide for promoting improved light insertion efficiency for the display assembly. Further, the optical element(s) may promote improvements in color quality, luminance and/or uniformity of graphics or graphical depictions displayed by the display assembly.

9 Claims, 7 Drawing Sheets

SYSTEM FOR IMPROVEMENT OF LIGHT INSERTION INTO A LIGHT GUIDE FROM LIGHT-EMITTING DIODES (LEDS)

FIELD OF THE INVENTION

The present invention relates to the field of displays and particularly to a system for promoting improvement of light insertion into a light guide from Light-Emitting Diodes (LEDs).

BACKGROUND OF THE INVENTION

Current displays may not provide a desired level of performance.

Thus, it would be desirable to provide a display system which obviates problems associated with current solutions.

SUMMARY OF THE INVENTION

Accordingly, an embodiment of the present invention is directed to a display assembly, including: a display panel; and a backlight module, the backlight module being connected to the display panel, the backlight module being configured for emitting a plurality of light beams, including a first light beam and a second light beam, the backlight module being further configured for providing the first light beam to the display panel, the backlight module including a light source and a light guide, the light source being configured for emitting the plurality of light beams, the light guide being configured for receiving the first light beam, the light guide being further configured for providing the first light beam to the display panel for illuminating the display assembly, the backlight module further including at least one optical element, the at least one optical element being located between the light source and an insertion edge of the light guide.

An additional embodiment of the present invention is directed to a backlight module for implementation in a display assembly and for illuminating a display panel of the display assembly, said backlight module including: a light source, the light source being configured for emitting a plurality of light beams including a first light beam and a second light beam; a light guide, the light guide being configured for receiving the first light beam, the light guide being further configured for providing the first light beam to the display panel for illuminating the display assembly; and at least one optical element, the at least one optical element being located between the light source and an insertion edge of the light guide.

A further embodiment of the present invention is directed to a backlight module for implementation in a display assembly and for illuminating a display panel of the display assembly, said backlight module including: a light source, the light source being configured for emitting a plurality of light beams including a first light beam and a second light beam; a light guide, the light guide being configured for receiving the first light beam, the light guide being further configured for providing the first light beam to the display panel for illuminating the display assembly, said display assembly being a Liquid Crystal Display (LCD) assembly; and at least one optical element, the at least one optical element being located between the light source and an insertion edge of the light guide, wherein the at least one optical element includes a prism element, wherein the first light beam enters the prism element at a first angle of incidence, passes through the prism element, and enters the light guide via the insertion edge of the light guide at a second angle of incidence, said second angle of incidence having a lesser value than the first angle of incidence, said prism element being further configured for back reflecting the second light beam towards the light source.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1-4, a display system/display assembly (ex.—a Liquid Crystal Display (LCD) assembly) in accordance with exemplary embodiments of the present invention is shown. In a current embodiment of the present invention, the LCD assembly 100 may include a backlight module 102 and an LCD panel/LCD/display 104. In further embodiments, the backlight module 102 may be connected to the LCD 104 and may be configured for providing light to/illuminating/directing light to the LCD 104.

Figure 1:
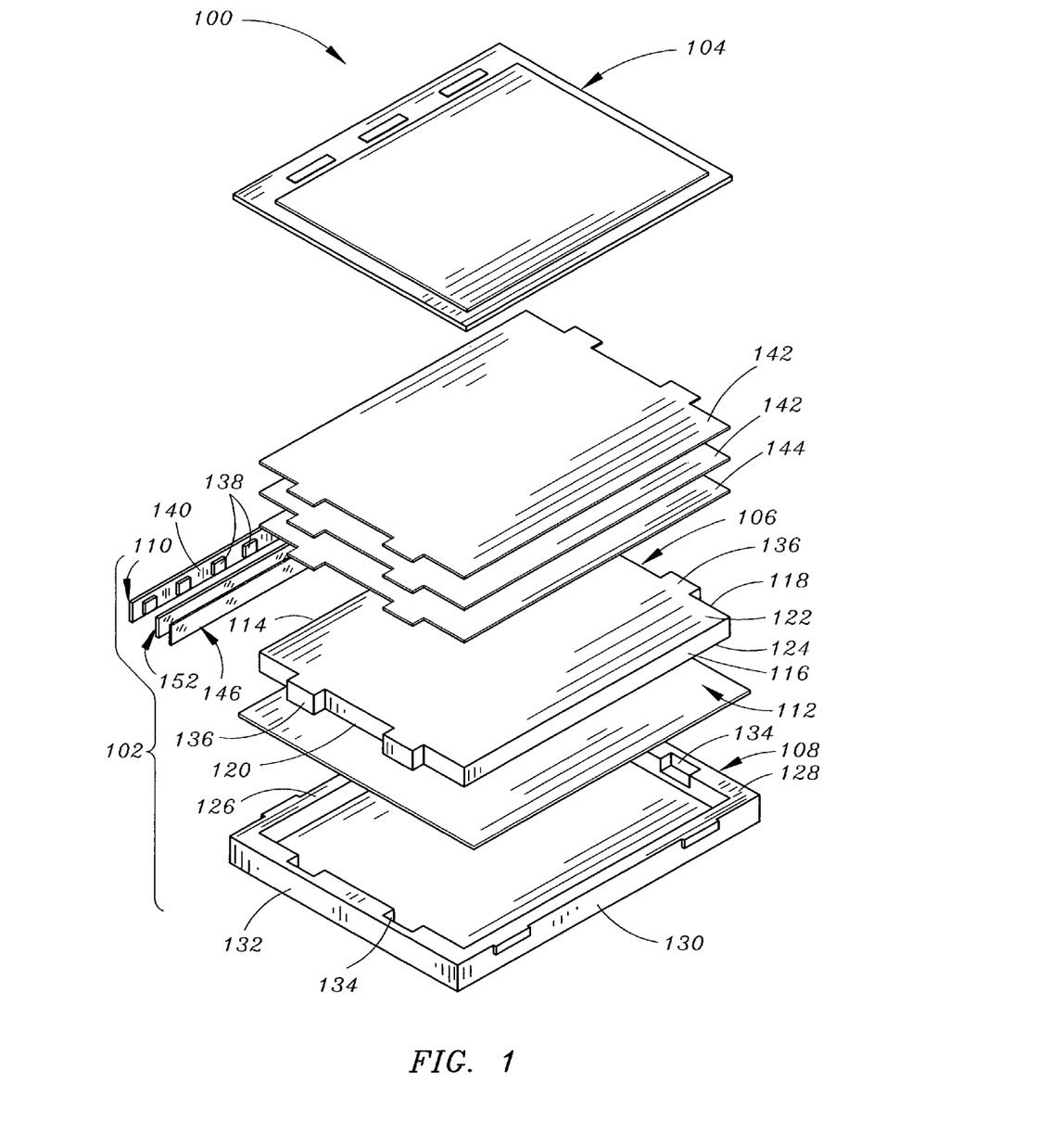
FIG. 1 is an exploded isometric view of a display assembly in accordance with an exemplary embodiment of the present invention.

In current embodiments of the present invention, the backlight module 102 may include a light guide plate/light guide 106, a frame 108, a light source 110, and a reflector film 112. As shown in the illustrated embodiments, the light guide 106 may be a generally rectangular-shaped plate having a first edge/side 114, a second edge/side 116, a third edge/side 118, a fourth edge/side 120, a top surface 122 (ex.—configured for being oriented generally towards the LCD 104 of the assembly 100, as shown in FIG. 1) and a bottom surface 124 (ex.—configured for being oriented generally away from the LCD 104 of the assembly, as shown in FIG. 1). For example, the first edge/side 114 may be a light incident surface/insertion edge (ex.—bottom edge) and the top surface 122 may be a light emitting surface.

In exemplary embodiments of the present invention, the frame 108 may be correspondingly shaped (ex.—may be generally rectangular-shaped) for/configured for at least partially receiving the light guide plate/light guide 106. For instance, the frame 108 may include a first side/wall 126, a second side/wall 128, a third side/wall 130 and a fourth side/wall 132, said walls (126, 128, 130, 132) forming a cavity/recess for receiving the light guide plate/light guide 106. Further, in an exemplary embodiment, one or more walls of the frame 108 may include/may form one or more notched recesses 134 (as shown in the illustrated embodiments) for receiving complementary-shaped protrusions 136 formed by the light guide plate/light guide 106 for facilitating secure seating/receiving of the light guide plate/light guide 106 within the frame 108.

Figure 2:
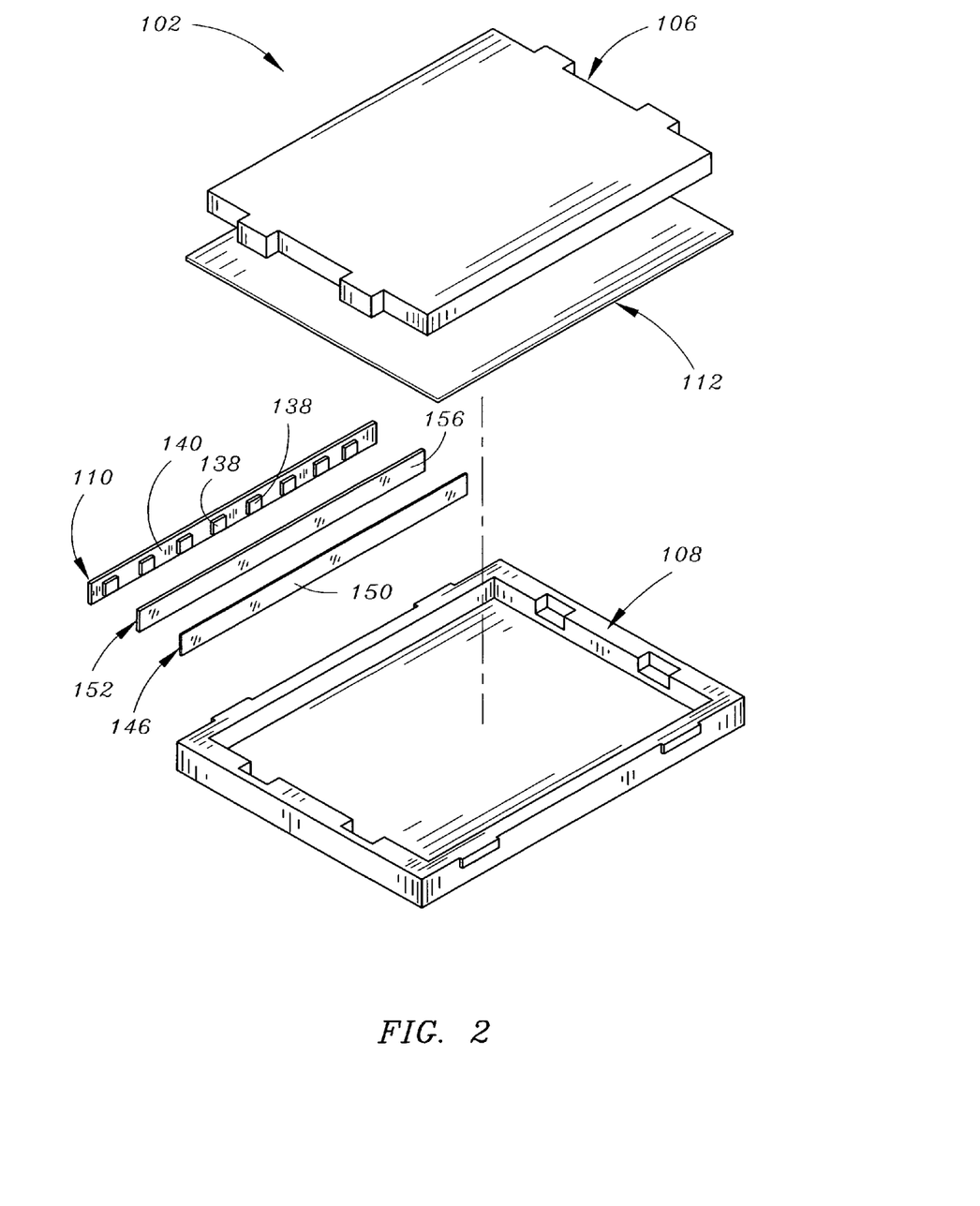
FIG. 2 is an exploded isometric view of a backlight module for the display assembly of FIG. 1, in accordance with an exemplary embodiment of the present invention.
Figure 3:
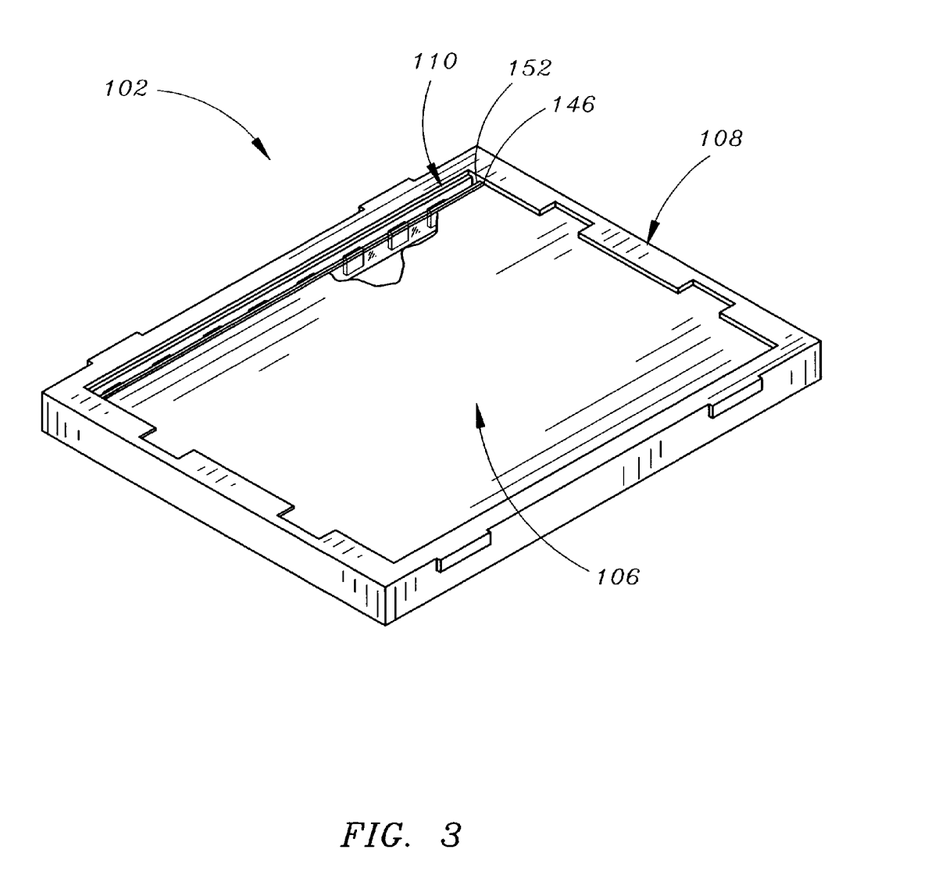
FIG. 3 is an assembled, cutaway view of the backlight module of FIG. 2, in accordance with an exemplary embodiment of the present invention.

In current embodiments of the present invention, the light source 110 may include a plurality of light-emitting diodes (LEDs) 138 and a strip 140. In further embodiments, the plurality of LEDs 138 may be adhered to/connected to/mounted upon the strip 140 in a linear arrangement. For instance, the strip 140 may be formed of metal, printed circuit board material, and/or the like. FIG. 2 is an assembled view of the backlight module 102 of the LCD assembly 100. During assembly of the backlight module 102, the light guide plate 106 may be placed into the frame 108. Further, the light source 110 may be placed into a space formed between the light incident surface 114 of the light guide/light guide plate 106 and a first side/wall 126 of the frame 108. Further, the LEDs 138 may be directed toward/oriented toward/faced toward the light incident surface 114. In additional embodiments, the reflector film/reflector film sheet 112 may be placed into the frame 108 prior to placing the light guide 106 into the frame 108.

In exemplary embodiments of the present invention, the LCD assembly 100 may include one or more sheets of brightness enhancement film 142 and a sheet of diffusing film 144. For instance, during assembly, after the light guide plate 106 is placed into the frame 108, the diffusing film sheet 144 may be placed into the frame 108, then the brightness enhancement film sheets 142 may be placed into the frame 108, such that the diffusing film sheet 144 is positioned between the brightness enhancement film sheets 142 and the light guide plate/light guide 106. The LCD panel 104 is then connected to the backlight module 102, such that the brightness enhancement film sheets 142 and diffusing film sheet 144 are positioned between the LCD panel 104 and the light guide plate 106, as shown in FIG. 1.

As mentioned above, a linear strip 140 of LEDs 138 may be implemented for generating/providing light, which may be provided/directed to an LCD panel 104 of the LCD assembly 100 via the light guide 106. Also, as mentioned above, the LEDs 138 may be located or positioned proximal to an edge/light incident surface 114 (ex.—bottom edge) of the light guide 106 of the LCD assembly 100. For example, the LCD assembly 100 may be suitable for use in a computing device.

Figure 4:
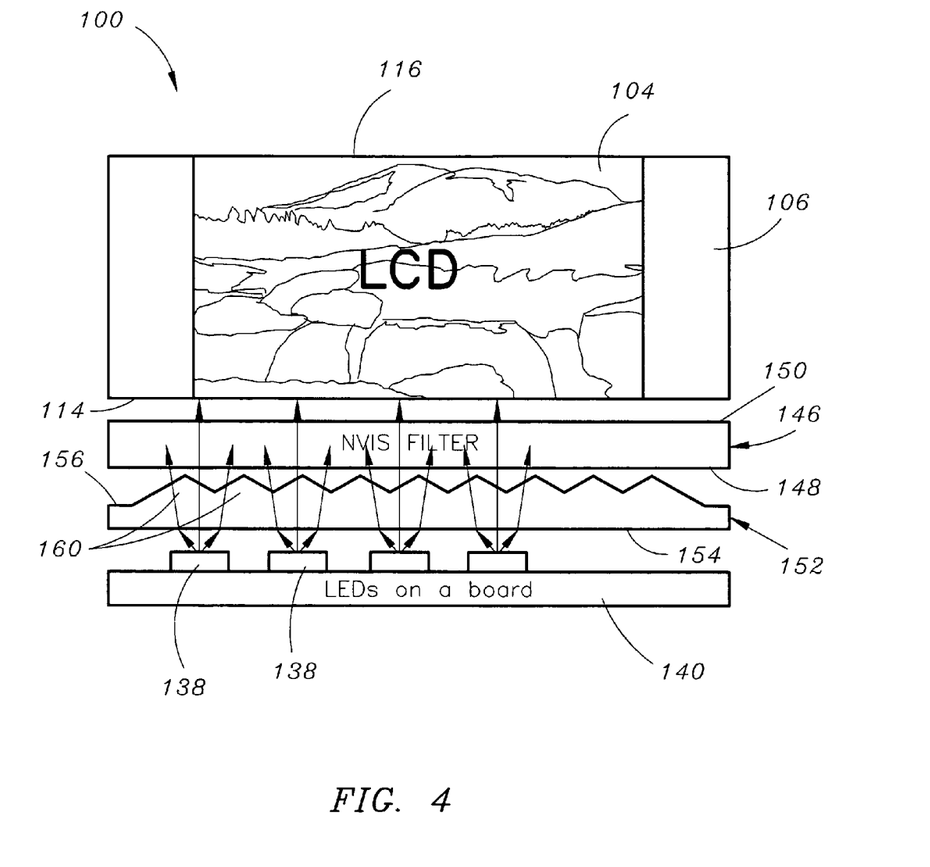
FIG. 4 is a block diagram illustration of the display assembly of FIG. 1, in accordance with an exemplary embodiment of the present invention.

In exemplary embodiments of the present invention, the LCD assembly 100 may further include one or more filters/optical filters/optical filter layers 146. In exemplary embodiments, the optical filters 146 may be absorbing filters, dielectric filters, Night Vision Imaging System (NVIS) filters, Infrared (IR) rejection filters (ex.—for Night Vision Goggles (NVG) compatibility) and/or polarizing filters. In the illustrated embodiment shown in FIGS. 1-4, the LCD assembly 100 implements a Night Vision Imaging System (NVIS) filter 146, which may be utilized for providing a night vision-compatible LCD assembly. The optical filter(s)/NVIS filter 146 may be implemented/located/positioned between the light source 110 and the light guide 106 of the LCD assembly 100 (as shown in FIGS. 1 and 4). Further, the optical filter/NVIS filter 146 may include a first face 148 (ex.—said first face 148 being oriented toward the light source 110) and a second face 150, said second face 150 being located generally opposite the first face 148 (ex.—said second face 150 being oriented away from the light source 110/toward the light guide 106). Still further, the optical filters 146 may be configured for changing a power spectral characteristic/power distribution of light/light beams provided by the light source 110 prior to insertion of said light beams into the light guide 106.

In current embodiments of the present invention, the LCD assembly 100 may include a prism element/prism element layer 152. In exemplary embodiments, the prism element/prism element layer 152, may be a prism sheet/strip of prism sheet/a prism strip/prism strip layer. For example, the prism strip 152 may be a strip of brightness enhancement film. In exemplary embodiments, the prism strip 152 may be implemented/located/positioned between the light source 110 and the light guide 106/insertion edge 114 of the light guide 106 of the LCD assembly 100. Further, the prism strip 152 may include a first face 154 (ex.—said first face 154 being oriented toward the light source 110) and a second face 156, said second face 156 being located generally opposite the first face 154 (ex.—said second face being oriented away from the light source 110/toward the light guide 106). In the embodiment illustrated in FIG. 4, the prism strip 152 includes prisms 160 and the prism strip 152 is configured/positioned/implemented such that said prisms are directed away from/are oriented away from/point away from the light source 110. Further, in embodiments of the LCD assembly 100 which include/implement an optical filter/NVIS filter 146, the prism strip 152 may be implemented/located/positioned between the light source 110 and the NVIS filter 146 (as shown in FIG. 4). The prism strip 152 may be configured for changing a power spectral characteristic/power spectral distribution of light/light beams provided by the light source 110 prior to insertion of said light/light beams into the light guide 106.

Figure 5:
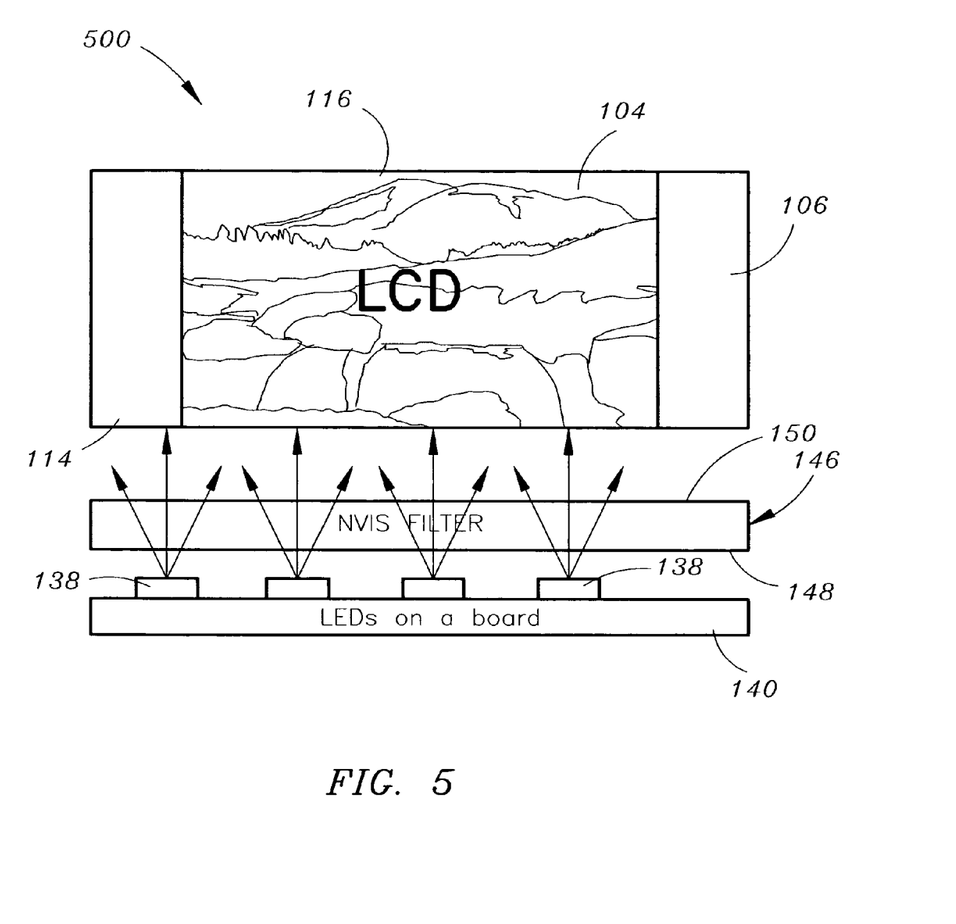
FIG. 5 is a block diagram illustration of a display assembly in accordance with an alternative exemplary embodiment of the present invention.

FIG. 5 illustrates an alternative embodiment of an LCD assembly 500, in which a NVIS filter 146 is implemented between the light source 110 and the light guide 106, but the LCD assembly 500 does not include/does not implement a prism element/prism strip 152. In such embodiments, light (ex.—a plurality of light beams) may be provided from the light source 110, such that a first set of light beams included in the plurality of light beams travel in/along a generally straight line path(s)/straight line path(s) through the NVIS filter 146 and to/into (ex.—may enter/insert into) the light guide 106. (ex.—said generally straight line path(s) being in-plane with the light emitting surface 122 of the light guide 106, being normal to the insertion edge 114 of the light guide 106, being perpendicular to the first and second faces (148, 150) of the NVIS filter 146, and being perpendicular to the insertion edge 114 of the light guide 106). Further, a second set of light beams included in the plurality of light beams may travel in/along an angled path(s) through the NVIS filter 146 and may travel into/insert into/enter the light guide 106 at an angle (ex.—the angled path(s) being non-perpendicular relative to the insertion edge 114/being non-perpendicular relative to a plane which is parallel to the insertion edge 114) of the light guide 106.

The first set of light beams, which travel in/along the straight line path(s) through the NVIS filter 146, do not create any discoloration problems with the visual appearance of graphical depictions provided by the display/LCD 104. However, the second set of light beams, which travel in/along the angled path(s) through the NVIS filter may cause discoloration problems (ex.—may become colored/may appear cyan) in the visual appearance of the display/LCD 104 (ex.—the LCD 104 may appear cyan/graphical depictions provided by the LCD may include cyan-colored patches). Further, because of the above-referenced problems with angled light beams, when looking along a bottom portion of the display assembly 500/along the bottom edge of the display assembly 500/proximal to the insertion edge 114 and light source 110 of the display assembly 500, it may be easy for a user of the display assembly 500 to visually ascertain where the LEDs 138 are located since light proximal to the LEDs 138 may look a different color. Further, because the light beams which travel in the straight path(s) through the NVIS filter 146 may more easily reach the far edge/top edge 116 (ex.—generally opposite the insertion edge 114) of the light guide 106 than the angled beams, the bottom portion of the display assembly 500 may appear more discolored/more cyan than a top portion/upper portion (ex.—generally opposite the bottom portion of the display assembly 500. In alternative embodiments, when a filter other than an NVIS filter 146 is implemented, the above-mentioned discoloration may make the display 104 appear to be a different color (ex.—a color other than cyan).

Referring again to the embodiment of the LCD assembly 100 shown in FIG. 4, as mentioned above, the LCD assembly 100 shown in FIG. 4 implements/includes a prism strip 152 along with an NVIS filter 146. The prism strip 152 may function to correct the above-referenced display discoloration problems which may occur when implementing an NVIS filter 146 without implementing a prism strip 152 (as is shown in FIG. 5). In exemplary embodiments of the present invention, the light source 110 may be configured for directing light beams towards the prism strip 152. Further, the light beams provided by the light source 110 may travel along a path(s) such that said light beams contact the first face 154 of the prism strip 152 at a non-perpendicular angle relative to the first face 154 of the prism strip 152/relative to a plane which is parallel to the first face 154 of the prism strip 152. The prism strip 152 may be configured for bending said angled beams, such that said bent beams pass through the prism strip 152/exit the second face 156 of the prism strip and are generally directed forward along/re-routed onto a generally straight line path(s) relative to the second face 156 of the prism strip 152/relative to a plane which is parallel to the second face 156 of the prism strip 152 and relative to the first face 148 of the NVIS filter 146/relative to a plane which is parallel to the first face 148 of the NVIS filter 146 (as shown in FIG. 4). For example, the angled light beams may contact the first face 154 of the prism strip 152/enter the prism strip 152 at a first angle of incidence, may then be bent/directed/refracted by the prism strip 152, may then exit the prism strip 152 via the second face 156 of the prism strip 152, and may then enter the light guide via the insertion edge 114 of the light guide at a second angle of incidence, the second angle of incidence being generally perpendicular to the insertion edge 114 of the light guide 106/being generally perpendicular to a plane which is parallel to the insertion edge 114 of the light guide 106, the second angle of incidence having a value which is less than the value of the first angle of incidence. In such manner, the prism strip 152 may promote increased insertion efficiency of the light beams into the light guide 106 by directing the light beams onto a path(s) via which said light beams may enter the NVIS filter 146, pass through the NVIS filter 146 and insert into/enter the light guide 106, with said path(s) being generally perpendicular to the insertion edge 114 of the light guide 106/generally perpendicular to a plane which is parallel to the insertion edge 114 of the light guide 106. In such manner as described above, the prism strip 152 may be configured for increasing directional gain in-plane with the light emitting surface 122 of the light guide 106 and for increasing directional gain normal to the insertion edge 114 of the light guide 106, thereby increasing the quality of/improving the visual appearance of graphics, graphical images, text and/or the like which may be displayed by the LCD assembly 100. Thus, because of the prism strip 152, light beams which pass through the NVIS filter 146 of the display assembly 100 shown in FIG. 4 may be less discolored (ex.—less cyan) than in an assembly 500 where beams pass through an NVIS filter 146, but do not pass through a prism strip 152 (as shown in FIG. 5).

In alternative embodiments, a lens may be implemented on the LED for providing advantages similar to the above-described advantages provided by the prism strip 152, however, implementing said lens may be less efficient than implementing a prism strip 152. In still further embodiments, the prism strip 152 may be bonded to a face(s) of the LED(s) 138/bonded to the light source 110, which may promote improved efficiency for the assembly 100 by reducing losses which may occur due to backscattering within the LED/LED package/LED cup.

Figure 6:
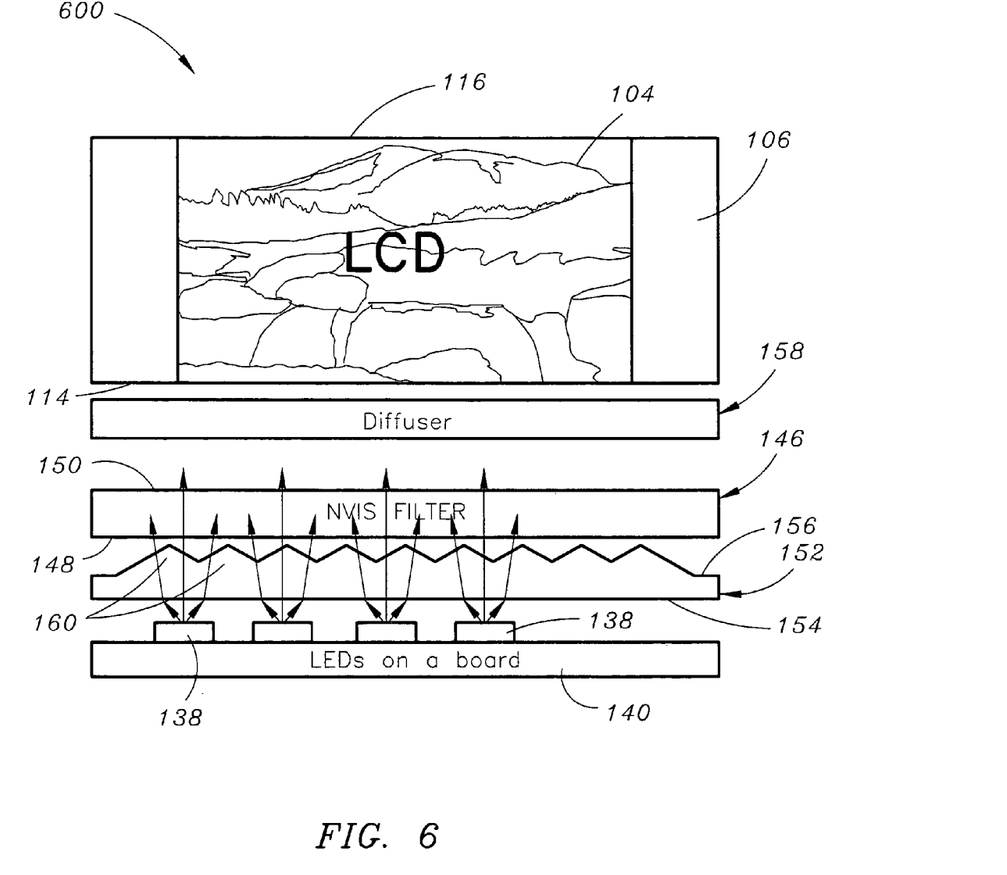
FIG. 6 is a block diagram illustration of a display assembly in accordance with a further alternative exemplary embodiment of the present invention.

In further alternative embodiments of the present invention, as shown in FIG. 6, the display assembly 600 may further include a light-scattering element, such as a diffuser/light diffuser 158. For example, the diffuser 158 may be implemented/located/positioned between an optical filter/NVIS filter 146 and a light guide 106 of the display assembly/LCD assembly 600. Further, the diffuser 158 may be configured for preventing bright spots from forming/appearing at the edge(s) of the display 104/LCD assembly 600. The diffuser 158 may be further configured for changing an angular distribution/angles/paths of light beams provided by the light source 110, prior to said light beams' insertion/entry into the light guide 106.

Figure 7:
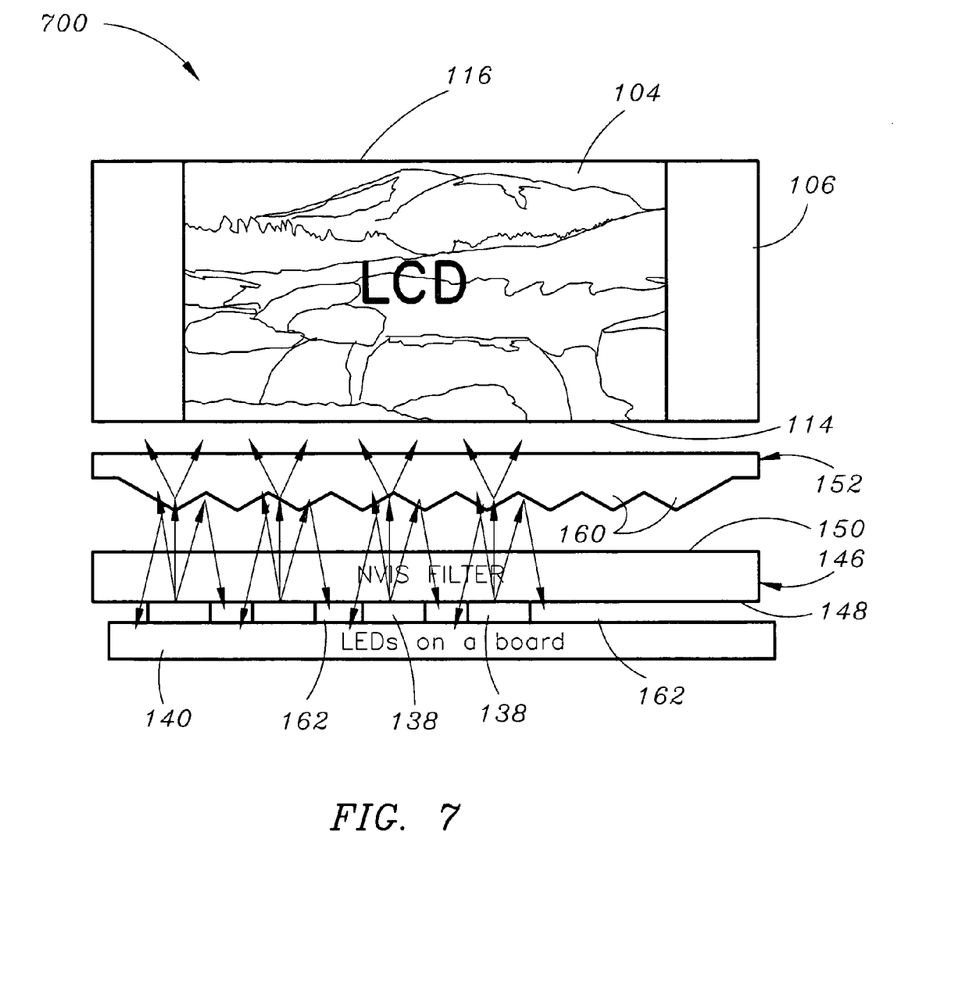
FIG. 7 is a block diagram illustration of a display assembly in accordance with an additional alternative exemplary embodiment of the present invention.

Referring to FIG. 7, an LCD assembly 700 in accordance with a further alternative exemplary embodiment of the present invention is shown. The LCD assembly 700 is configured much like the LCD assembly 100 shown in FIG. 4. However, although the LCD assembly 700 shown in FIG. 7 implements a prism strip 152, the prism strip 152 implemented in the LCD assembly 700 shown in FIG. 7 is reversed/turned over compared to the prism strip 152 implemented in the LCD assembly 100 shown in FIG. 4. For example, the prisms 160 of the prism strip 152 implemented in the assembly 700 shown in FIG. 7 are directed toward/oriented toward/point toward the light source 110, whereas, in the assembly 100 shown in FIG. 4, the prisms 160 of the prism strip 152 are directed away from the light source 110. Further, in the LCD assembly 700 shown in FIG. 7, the prism strip 152 may be implemented/located/positioned between the NVIS filter 146 and the light guide 106, whereas, in the assembly 100 shown in FIG. 4, the prism strip 152 may be implemented/located/positioned between the NVIS filter 146 and the light source 110.

Further, in the LCD assembly 700 shown in FIG. 7, the prism sheet 152 allows light beams which are traveling along a generally perpendicular path relative to the insertion edge 114/relative to a plane which is parallel to the insertion edge 114 of the light guide 106 to be directed to the light guide, but rather than directing more of the light/light beams forward (ex—rather than bending the light beams to direct them in a generally perpendicular path relative to the insertion edge 114/relative to a plane which is parallel to the insertion edge 114 of the light guide 106), the prism sheet 152 (as implemented in the LCD assembly 700 shown in FIG. 7) causes high angle light beams included in the plurality of light beams (ex.—light beams which pass through the NVIS filter 146 at angles/high angles/large angles/non-perpendicular angles relative to the second face 150 of the NVIS filter 146/relative to a plane which is parallel to the second face 150 of the NVIS filter 146) to be reflected back toward the light source 110 and to be mostly lost.

The assembly 700 shown in FIG. 7 may be less efficient than the assembly 100 shown in FIG. 4, however, assembly 700 may be advantageous in that it may eliminate most of the discolored light provided by the light source 110 such that said discolored light may be prevented from entering the light guide 106. By reversing the orientation/positioning of the prism strip 152 so that it is positioned as shown in FIG. 7, the prism strip 152 may be configured to act as a beam splitter element, thereby multiplying (ex.—doubling) the apparent number of LEDs 138. Further, the assembly 700 of FIG. 7 may promote improved luminance uniformity along the edge(s) of the display 104/display assembly 700 and may promote improved luminance uniformity across the display 104/display assembly 700 (ex.—from top to bottom). Still further, in the assembly 700 shown in FIG. 7, implementation of the prism strip/prism film 152 as shown may allow the LEDs 138 to be very close to/in contact with the NVIS filter 146, thereby promoting increased efficiency of directing/getting light through the filter and into the display 104/light guide 106. Still further, a diffuser 158 may also be implemented in the assembly 700 shown in FIG. 7 and may be positioned/located between the prism strip 152 and the light guide 106 for promoting improved luminance uniformity.

In alternative embodiments of the assembly 700 shown in FIG. 7, rather than turning the prism strip over/orienting the prisms toward the light source, similar advantages may be obtained by utilizing a commercially available film (ex.—a Transmissive Right Angle Film (TRAF) element) as the prism strip 152.

In further embodiments, the assembly 100 may further include a reflector(s) 162. In exemplary embodiments, the reflector 162 may be added onto/located on the light source strip 140 of LEDs 138. For example, the reflector 162 may be attached to the light source strip 140 (ex.—attached to the printed circuit board material forming the light source strip 140) and positioned/located/placed around the LEDs 138. The reflector 162 may be a diffuse reflector (ex.—a white material) or a specular reflector (ex.—a shiny material). Further, the reflector(s) 162 may be configured for recycling back scattered light into the light guide 106, thereby preventing losses associated with backscatter and absorption between the LEDs 138.

In additional embodiments, the assembly 100 may implement/include one or more of a number of various holographic elements for changing an angular distribution, polarization, and/or a power spectral characteristic/power spectral distribution of the light beams/light provided by the light source 110 prior to insertion of said light beams/light into the light guide 106. In further embodiments, the assembly 100 may implement/include one or more of a number of various active elements for changing a light polarization state of light beams/light provided by the light source 110 prior to insertion of said light beams/light into the light guide 106. In still further embodiments, the assembly 100 may implement/include one or more diffraction gratings for changing an angular distribution of light beams/light provided by the light source 110 prior to insertion of said light beams/light into the light guide 106. In additional embodiments, the assembly 100 may include/implement fluorescent material(s), phosphorescent material(s), and/or non-linear optical material(s) for changing a power spectral characteristic/power spectral distribution of light/light beams provided by the light source 110 prior to insertion of said light beams/light into the light guide 106.

In exemplary embodiments of the present invention, one or more optical elements (ex.—prism elements, optical filters, diffusers, reflectors, holographic elements, active elements, diffraction gratings, fluorescent materials, phosphorescent materials, non-linear optical materials), such as described above, may be implemented, either alone or in various combinations, between the light source and the light guide in display systems/backlight modules (ex.—in the assemblies/systems described herein) for promoting/providing the above-referenced advantages/characteristics/functions in the exemplary systems/exemplary embodiments of the present invention.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A backlight module for implementation in a display assembly and for illuminating a display panel of the display assembly, said backlight module comprising:
    a light source, the light source being configured for emitting a plurality of light beams including a first light beam and a second light beam;
    a light guide, the light guide being configured for receiving the first light beam, the first light beam having an angle of incidence being generally perpendicular to an insertion edge of the light guide, the light guide being further configured for providing the first light beam to the display panel for illuminating the display assembly;
    an optical filter, the optical filter configured for changing a power spectral distribution of the plurality of light beams prior to insertion of the first light beam into the light guide, the optical filter in contact with the light source; and
    at least one optical element, the at least one optical element being located between the optical filter and an insertion edge of the light guide, the at least one optical element comprising a prism element, wherein said prism element is configured for allowing the first light beam to pass through the prism element to the light guide, said prism element being further configured for back reflecting the second light beam towards the light source such that the second light beam is mostly lost, the second light beam having an angle of incidence being generally non-perpendicular to the insertion edge of the light guide.

2. A backlight module as claimed in claim 1, wherein the optical filter is one of: a Night Vision Imaging System (NVIS) filter; an absorbing filter; a dielectric filter; an Infrared (IR) rejection filter; and a polarizing filter.

3. A backlight module as claimed in claim 1, wherein the at least one optical element includes a reflector, said reflector configured for directing back-scattered light to the light guide.

4. A backlight module as claimed in claim 1, wherein the at least one optical element includes a light-scattering element, said light scattering element configured for changing an angular distribution of the plurality of light beams prior to insertion of the first light beam into the light guide.

5. A backlight module as claimed in claim 1, wherein the at least one optical element includes a holographic element, said holographic element configured for changing at least one of: an angular distribution of the plurality of light beams, a polarization of the plurality of light beams, and a power spectral distribution of the plurality of light beams prior to insertion of the first light beam into the light guide.

6. A backlight module as claimed in claim 1, wherein the at least one optical element includes an active element, said active element configured for changing a light polarization state of the plurality of light beams prior to insertion of the first light beam into the light guide.

7. A backlight module as claimed in claim 1, wherein the at least one optical element includes a diffraction grating, said diffraction grating configured for changing an angular distribution of the plurality of light beams prior to insertion of the first light beam into the light guide.

8. A backlight module as claimed in claim 1, wherein the at least one optical element includes at least one of: a fluorescent material and a phosphorescent material, each of said fluorescent material and said phosphorescent material being configured for changing a power spectral distribution of the plurality of light beams prior to insertion of the first light beam into the light guide.

9. A backlight module as claimed in claim 1, wherein the at least one optical element includes a non-linear optical material, said non-linear optical material configured for changing a power spectral distribution of the plurality of light beams prior to insertion of the first light beam into the light guide.

* * * * *